A. R. WESTERDAHL.
TROLLEY.
APPLICATION FILED JAN. 8, 1920.

1,355,023.

Patented Oct. 5, 1920.

WITNESSES

INVENTOR
A. R. WESTERDAHL.
BY

UNITED STATES PATENT OFFICE.

ANTON R. WESTERDAHL, OF GUANTANAMO BAY, CUBA.

TROLLEY.

1,355,023.   Specification of Letters Patent.   Patented Oct. 5, 1920.

Application filed January 8, 1920. Serial No. 350,107.

*To all whom it may concern:*

Be it known that I, ANTON R. WESTERDAHL, a citizen of the United States, and a resident of Guantanamo Bay, Cuba, have invented a new and Improved Trolley, of which the following is a full, clear, and exact description.

This invention relates to improvements in trolleys, an object of the invention being to provide a link or connecting rod which engages the sheave pins of the trolley and imparts great strength and durability to the structure.

A further object is to provide a link of the character stated which can be placed in position on trolleys as now constructed and which is capable of adjustment to suit the structure on which it is used.

With these and other objects in view the invention consists in certain novel features of construction, and combinations and arrangements of parts as will be more fully hereinafter described and pointed out in the claims.

In the accompanying drawings—

Figure 1:
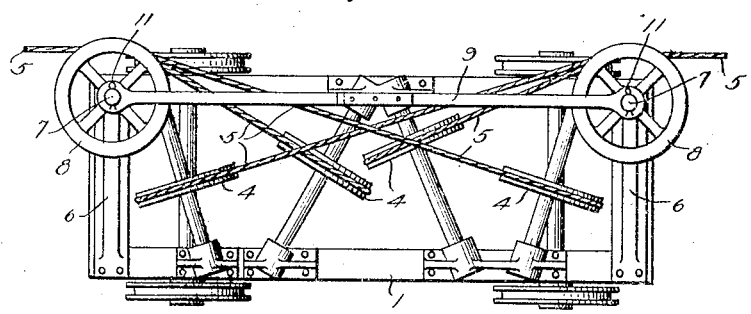
Figure 1 is a top plan view illustrating a trolley embodying my improvements.
Figure 2:
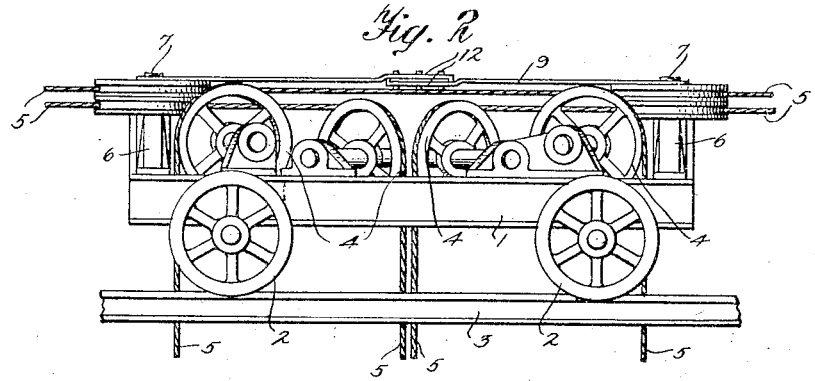
Fig. 2 is a view in side elevation.
Figure 3:
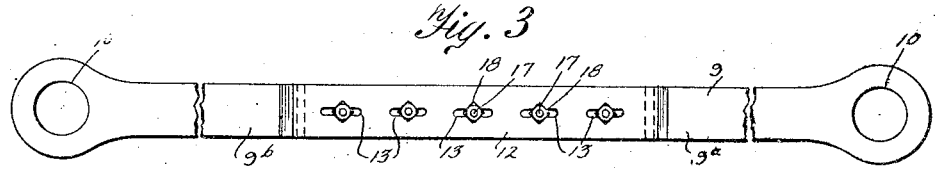
Fig. 3 is a broken plan view on an enlarged scale illustrating my improved link or connecting rod.
Figure 4:
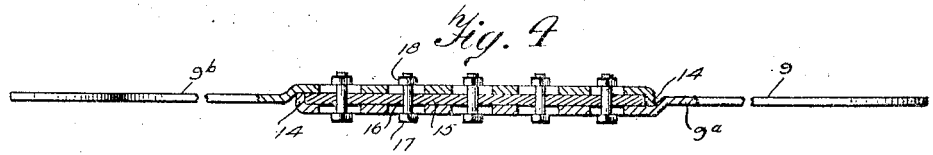
Fig. 4 is a view in longitudinal section of Fig. 3.
Figure 5:
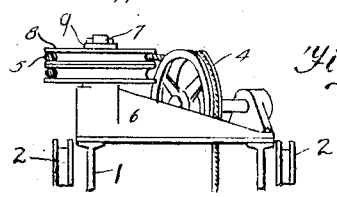
Fig. 5 is a fragmentary end view.

1 represents the frame of the trolley having wheels 2 supported on a track 3. The frame 1 supports any desired number and arrangement of pulleys 4 to facilitate the operation of the cables 5. Carriers 6 are secured to the frame 1 at the ends of the latter and have sheave pins 7 fixed thereto and support horizontal end sheaves 8 over which certain of the cables 5 are positioned.

The structure above described is in common use and forms no part of the present invention except in combination with my improved link 9 which will be hereinafter described.

The sheaves 8, the sheave pins 7, and carriers 6 are subjected to a great strain which frequently results either in shearing the bolts securing the carrier, breaking the sheave pin carriers or otherwise injuring the trolley, and to overcome this defect I employ my improved link 9 which is provided with openings 10 in its ends receiving the upper or outer ends of the sheave pins 7 and held in place thereon by cotter pins 11, or any other form of securing device. The link 9 not only serves to strengthen the sheave mount at each end, but also compels the strains of one sheave mount to be equalized by sharing this strain with the other sheave mount, and hence, the entire framework is effectually tied together to prevent the breaking and shearing above referred to.

The link 9 comprises two members 9$^a$ and 9$^b$, both members having laterally offset portions 12 provided with longitudinal slots 13. Laterally projecting tongues 14 are formed at the ends of the offset portions 12 and a filler piece 15, known in the trade as a "dutchman," is located between the offset portions and is provided with openings 16 receiving bolts 17 which are projected through the slots 13 and secured by nuts 18 clamping the link members to the filler piece. The engagement of the tongues 14 with the ends of the filler piece absolutely prevent possibility of longitudinal movement, and the parts are securely clamped together by the bolts.

If a variation in adjustment is desired, it is simply necessary to substitute the proper length of filler piece, and the slots 13 in the members allow for varying positions of the bolts to suit different filler pieces, and hence, permit a sufficient adjustment to perform all necessary functions.

Various slight changes may be made in the general form and arrangement of parts described without departing from the invention, and hence I do not limit myself to the precise details set forth but consider myself at liberty to make such changes and alterations as fairly fall within the spirit and scope of the appended claims.

I claim:

1. The combination with a frame, a pair of sheave pins on the frame, and sheaves on the pins, of a link connecting the outer ends of the pins, said link comprising two members, each member having a pin receiving opening in one end and having a laterally offset portion at its other end, a filler piece located between the laterally offset portions, and securing devices projected through the filler piece and through said laterally offset portions.

2. The combination with a frame, carriers secured to the frame, and sheave pins on the carriers, of a link connecting the outer ends of the pins, said link comprising two members, each member having a pin receiving opening in one end and having a laterally offset portion at its other end, a filler piece located between the laterally offset portions, and securing devices projected through the filler piece and through said laterally offset portions.

3. A link of the character stated, comprising two members, each member having a pin receiving opening in one end and having a laterally offset portion at its other end with longitudinal slots therein, laterally projecting tongues on the ends of the offset portions, a filler piece fitting the offset portions and located between them, said filler piece having openings therein, bolts located in said openings and projecting through the slots in the members, and clamping nuts on the bolts.

ANTON R. WESTERDAHL.